United States Patent
Schwarz et al.

(10) Patent No.: US 9,735,561 B2
(45) Date of Patent: Aug. 15, 2017

(54) EXPLOSION-PROOF CABLE CONNECTING ASSEMBLY

(71) Applicant: R. Stahl Schaltgerate GmbH, Waldenburg (DE)

(72) Inventors: Normen Schwarz, Weimar (DE); Wolf Hermann, Ohringen (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 0 days.

(21) Appl. No.: 14/646,975

(22) PCT Filed: Nov. 6, 2013

(86) PCT No.: PCT/EP2013/073147
§ 371 (c)(1),
(2) Date: May 22, 2015

(87) PCT Pub. No.: WO2014/079688
PCT Pub. Date: May 30, 2014

(65) Prior Publication Data
US 2015/0303675 A1  Oct. 22, 2015

(30) Foreign Application Priority Data
Nov. 22, 2012  (DE) .......................... 10 2012 111 270

(51) Int. Cl.
*H01R 4/20* (2006.01)
*H02G 15/08* (2006.01)
(Continued)

(52) U.S. Cl.
CPC .............. *H02G 15/08* (2013.01); *H01B 3/18* (2013.01); *H01R 4/20* (2013.01); *H01R 43/048* (2013.01);
(Continued)

(58) Field of Classification Search
CPC ......... H01R 4/20; H02G 15/013; H02G 15/04
(Continued)

(56) References Cited

U.S. PATENT DOCUMENTS 3,123,663 A * 3/1964 Muldoon ................. H01R 4/20
174/112
3,150,233 A * 9/1964 Dinger ...................... H01R 4/20
174/22 R
(Continued)

FOREIGN PATENT DOCUMENTS

CN  1531151 A  9/2004
DE  4102989 C1  5/1992

OTHER PUBLICATIONS

Office Action issued Aug. 31, 2016, in Chinese Patent Application No. 201380060896.6, filed Nov. 6. 2013 (w/ English-language translation).

*Primary Examiner* — Chau N Nguyen
(74) *Attorney, Agent, or Firm* — Leydig, Voit & Mayer, Ltd.

(57) ABSTRACT

The invention relates to an assembly (14) of a cable-connecting device (10) and a multi-core cable (11), which form a mechanical, explosion-proof connection to each other. For this purpose, the cable-connecting device (10) has a plastically deformable outer sleeve (18) having a crimping section (23). A hollow cylindrical inner sleeve (19) made of elastically deformable material is arranged between a cable sheath (13) made of elastomer and the crimping section (23). An elastic deformation of the inner sleeve (19) and of the cable sheath (13) is caused by radially plastically deforming the crimping section (23). Any gaps (40) present within the cable sheath (13) are closed due to the radial forces in the crimping section (23) such that spark-gap-free contact between the cable sheath (13) and the cores (12) of the cable
(Continued)

(11) and between the cable sheath (13) and the inner sleeve (19) is ensured.

9 Claims, 4 Drawing Sheets

(51) Int. Cl.
*H02G 3/06* (2006.01)
*H02G 15/013* (2006.01)
*H01B 3/18* (2006.01)
*H01R 43/048* (2006.01)
*H02G 3/08* (2006.01)

(52) U.S. Cl.
CPC ......... *H02G 3/0658* (2013.01); *H02G 15/013* (2013.01); *H02G 3/088* (2013.01)

(58) Field of Classification Search
USPC .................................. 174/76, 77 R, 84 C
See application file for complete search history.

(56) References Cited

U.S. PATENT DOCUMENTS

| | | | | |
|---|---|---|---|---|
| 3,922,477 | A * | 11/1975 | Glowacz | H01R 13/746 174/18 |
| 3,935,373 | A * | 1/1976 | Smith | H02G 15/013 174/77 R |
| 5,911,248 | A * | 6/1999 | Keller | H01B 7/16 141/59 |
| 6,100,472 | A * | 8/2000 | Foss | G02B 6/4428 174/77 R |
| 6,608,254 | B1 * | 8/2003 | Bernollin | G02B 6/4428 174/84 R |
| 6,638,107 | B1 * | 10/2003 | Silfverberg | H01R 4/20 439/275 |
| 7,683,260 | B2 * | 3/2010 | Bertini | H01R 13/5216 174/84 C |
| 2010/0108020 | A1 | 5/2010 | Miretti | |

* cited by examiner

EXPLOSION-PROOF CABLE CONNECTING ASSEMBLY

FIELD OF THE INVENTION

The invention relates to an explosion-proof assembly having a cable-connecting device and a cable that is mechanically connected thereto. The cable-connecting device, for example, is disposed to guide a cable comprising several cores in an explosion-proof manner through the wall of an explosion-proof housing or to encapsulate an electrical cable connection in an explosion-proof manner.

BACKGROUND OF THE INVENTION

An explosion-proof cable screw connection has been known from publication DE 10 2010 006 893. Considering this cable screw connection, a fitting is used for fastening it to a housing. The cable screw connection overall has the form of a sleeve, and the cable extends along a cable conduit in the sleeve. A pressure element is screwed to a fitting which contains a hollow cylindrical sealing body. When the pressure element is screwed to the fitting, the sealing body is compressed in axial direction, in which case it expands in radially inward direction in the cable conduit and is pressed against the cable. During this axial shifting, it is also possible to create an axial movement between two complementary wedge surfaces, between which a clamping gap is formed. A cable shielding may be clamped in this clamping gap.

Similar cable screw connections have also been known from practical applications. Indeed, cables comprising several cores, for example, can be threaded through a wall of an explosion-proof housing. However, it has been found that with such screw connections the material of the cable sheathing can be deformed at a small location. Due to settling effects, it is possible for gaps to form and enlarge, and jeopardize a lasting ignition transmission protection.

Therefore, in order to ensure a lasting ignition transmission protection, each core of a cable is connected separately in an explosion-proof manner, for example, by being cast. The effort and the related setup are thus very expensive.

In addition, crimping sleeves as described in publication DE 102 58 100 B4 have been known for the mechanical connection of a cable-connecting device. In that case, the crimping sleeve is disposed for clamping a cable in place on a sensor body.

OBJECTS AND SUMMARY OF THE INVENTION

It is an object of the present invention to provide an improved explosion-proof assembly between a cable-connecting device and a cable.

The subject explosion-proof assembly connects the cable-connecting device with a cable comprising at least one, and preferably several cores, wherein a cable sheath of an elastomer material is provided which encloses the one core or said several cores.

Consequently, an assembly is produced in which—different until now—a cable is threaded, independently of the number of cores, through a cylindrical cable conduit of the cable-connecting device and fastened there in an explosion-proof manner. To accomplish this, the cable-connecting device comprises an outer sleeve with a crimping section. In its original condition, the crimping section preferably has a hollow cylindrical form. The crimping section consists of a plastically deformable material, preferably a metal, i.e., steel, in the exemplary embodiment. Furthermore, an inner sleeve is provided in the form of a hollow cylinder in its undeformed original condition which defines a cylindrical cable conduit. The inner sleeve consists of a deformable second material, for example of an elastomer or a wrought alloy, in particular an aluminum wrought alloy. The first material and the second material are different from each other.

The inside diameter of the inner sleeve, i.e., the diameter of the cable conduit, corresponds essentially to the outside diameter of the cable sheath of the cable. The crimping section and/or the outer sleeve enclose the inner sleeve in coaxial direction. In order to establish the mechanical connection between the cable-connecting device and the cable, the crimping section of the outer sleeve is mechanically deformed with a crimping tool so that the radial dimensions of the crimping section are reduced. As a result of this, an elastic deformation of the inner sleeve, as well as of the cable sheath, is achieved. In doing so, it is essential that the inner sleeve, as well as the cable sheath, consist of elastically deformable material. A plastic material flow of the inner sleeve and of the cable sheath is avoided. This is important because a settling of the material can cause ignition gaps to be formed over time in the device, which is avoided in accordance with the invention.

The elastic deformation of the cable sheath has the effect that said sheath is in intimate contact with the inner sleeve, on the one hand, and with the enclosed cores of the cable, on the other hand, in a manner so as to be free of ignition gaps. Consequently, no ignition gap is present on the inside of the cable that is enclosed by the cable sheath. The cable sheath is pressed radially inward over the inner sleeve along its entire circumferential region and also encloses the electrical cores extending therein in a manner without ignition gaps.

The embodiment of the cable-connecting device without ignition gaps is to be understood to mean that, indeed, an implementation of a cable that is completely free of ignition gaps can be achieved. However, small ignition puncture-proof gaps having a sufficiently small cross-section and/or sufficient length may be present. For example, such small ignition puncture-proof gaps may exist between several adjacent cores and/or between the at least one core and the cable sheath and/or between the cable sheath and the inner sleeve and/or between the inner sleeve and the outer sleeve.

With the use of the subject cable-connecting device, a multi-core cable can be very easily enclosed in an explosion-proof manner by means of a housing wall and in the region of an electrical connecting point. A separate explosion-proof connection for each electrical core is not necessary. Even a gap potentially existing inside the cable sheath is sufficiently reduced in size or eliminated, so that the requirements of an explosion protection are safely satisfied.

It is advantageous if the crimping section of the outer sleeve has an inside diameter in undeformed condition that essentially corresponds to the outside diameter of the inner sleeve. Preferably, the inside diameter of the crimping section in undeformed condition is at most as large as the outside diameter of the inner sleeve. Consequently, it is ever possible in undeformed state to avoid larger gaps between the inner sleeve and the outer sleeve, thus simplifying the formation of the explosion-proof connection with the cable.

When the inner and the outer sleeves are coaxial relative to each other, these two sleeves are arranged preferably in a contact section of the outer sleeve at least adjacent to an axial crimping section, irrespective of whether the crimping section of the outer sleeve has already been deformed or not.

In particular, the contact section of the outer sleeve remains undeformed during the crimping operation. Due to this connection without ignition gap between the inner and the outer sleeves in the contact section, it can be ensured that—even if an ignition gap should form between the outer sleeve and the inner sleeved due to the deformation of the crimping section—there is an ignition puncture-proof connection between the two sleeves.

At least one seal may be provided between the inner sleeve and the outer sleeve. The seal may be configured as an O-ring, for example. In particular in the case of a non-circular deformation of the crimping section with a crimping tool to form the connection, it is possible to achieve a protection against the penetration of dust and/or moisture with this seal. It is also possible for several such seals to be provided. For positioning of the seal, the inner sleeve may have an annular groove that is open toward the outside. Preferably, the depth of the annular groove is less than the radial dimension of the cross-section of the seal so that said seal protrudes radially from the annular groove and abuts in a sealing manner between the inner sleeve and the outer sleeve after their coaxial arrangement.

In a particularly preferred embodiment the length of the crimping section that is deformed with the use of a crimping tool to establish the mechanical connection with the cable is greater than the inside diameter of the crimping section. Due to this relationship between the length and the inside diameter of the crimping section, the elastic deformation occurs over a sufficient axial length on the inner sleeve and the cable sheath and that a material flow or a material displacement in axial direction is reduced or avoided. As a result, the prevention of an ignition gap in the established connection is further improved. Independent of the inside diameter of the crimping section, the length of the crimping section is preferably at least six millimeters.

Other objects and advantages of the invention will become apparent upon reading the following detailed description and upon reference to the drawings, in which:

Figure 1:
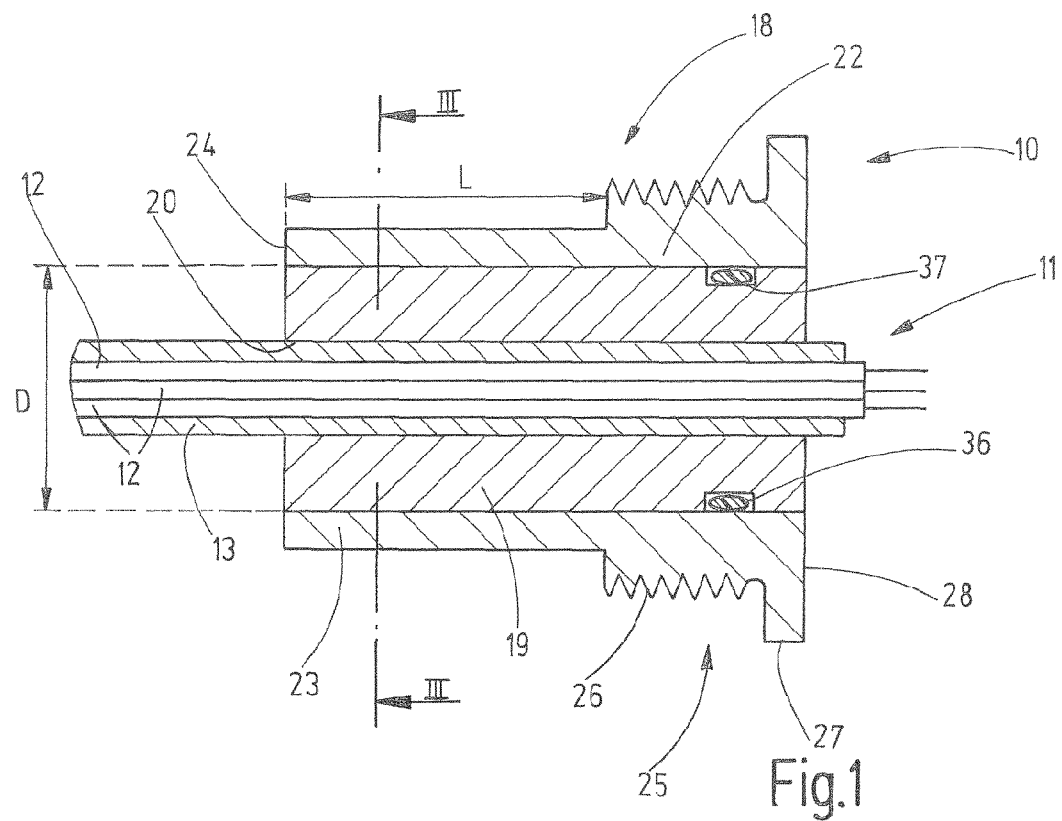
FIG. 1 is a longitudinal section of an illustrative cable connecting device in accordance with the invention shown with a multi-core cable supported in an undeformed condition.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to the drawings, there is shown an illustrative cable connecting device 10 in accordance with the invention disposed for establishing an explosion proof mechanical connection with a cable 11. It will be understood that with the use of the cable connecting device 10 it is possible to provide an explosion-proof cable passage through a housing wall or an electrical connecting point between several cables consistent with explosion protection regulations.

The cable 11 comprises at least one core 12 and, in accordance with the illustrated example, several cores 12, that, together, are enclosed by a cable sheath 13. The cable sheath 13 consists of an elastomer and is thus elastically deformable in radial direction relative to the extension or elongated direction of the cable 11. When the connection is established between the cable-connecting device 10 and the cable 11, an explosion-proof assembly 14 (FIGS. 1, 4 and 6 through 8) is formed.

The cable-connecting device 10 comprises an outer sleeve 18 and an inner sleeve 19. To be able to thread the cable 11 through the device, the inner sleeve 19 has a hollow cylindrical form that defines a cylindrical cable conduit 20 having an inside diameter that—in the exemplary embodiment—corresponds to the outside diameter of the sheath 13 of the cable 11. The inside diameter of the cable conduit 20 may also be somewhat smaller than the outside diameter of the cable sheath so that the inner sleeve 19 is slipped on the cable sheath 13 while being elastically deformed.

Figure 2:
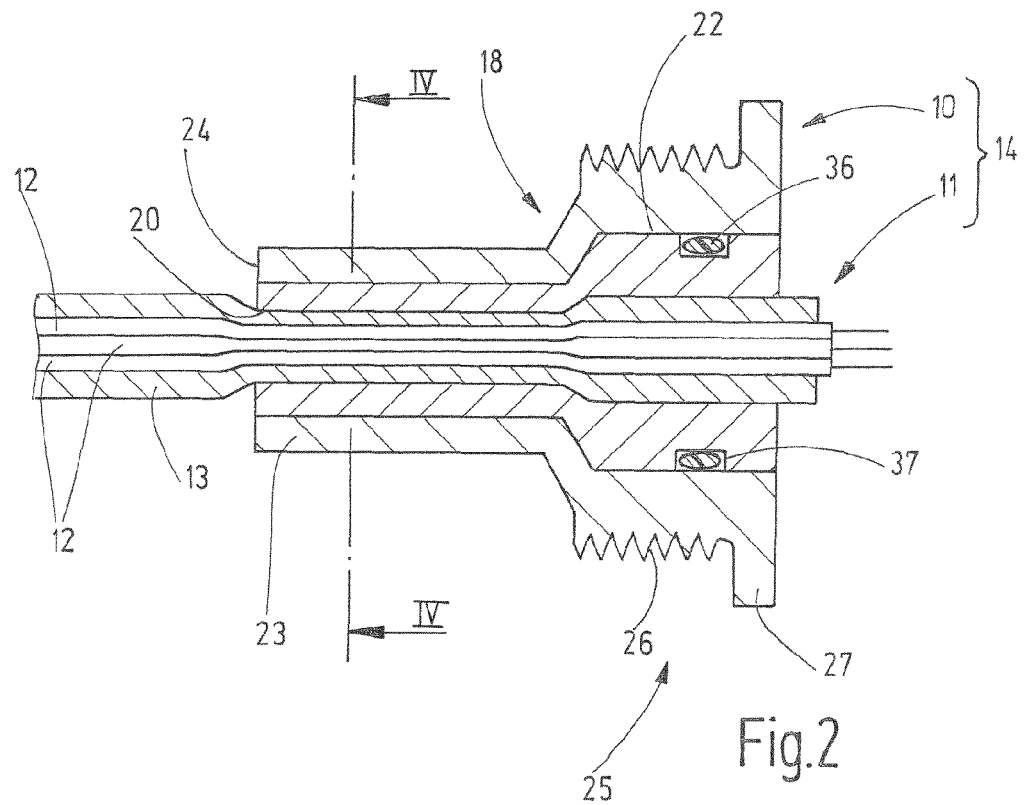
FIG. 2 is a longitudinal section of the cable connecting device shown in FIG. 1 with an explosion-proof connection with the cable established.

Referring to the exemplary embodiment as in FIGS. 1 and 2, the outer sleeve 18—in undeformed original condition—has a hollow cylindrical crimping section 23 that is disposed for deformation with a crimping tool of a conventional type. In accordance with the example, the inside diameter of the crimping section 23 corresponds to the outside diameter of the inner sleeve 19 when the crimping section 23 undeformed, as is shown by FIG. 1. In its undeformed original condition (FIG. 1), the crimping section 23—measured in an extension or elongated direction of the cable 11—has an axial length L that is greater than the inside diameter D of the crimping section 23. This axial length L is available for the deformation of the crimping section 23 by means of the crimping tool.

Figure 3:
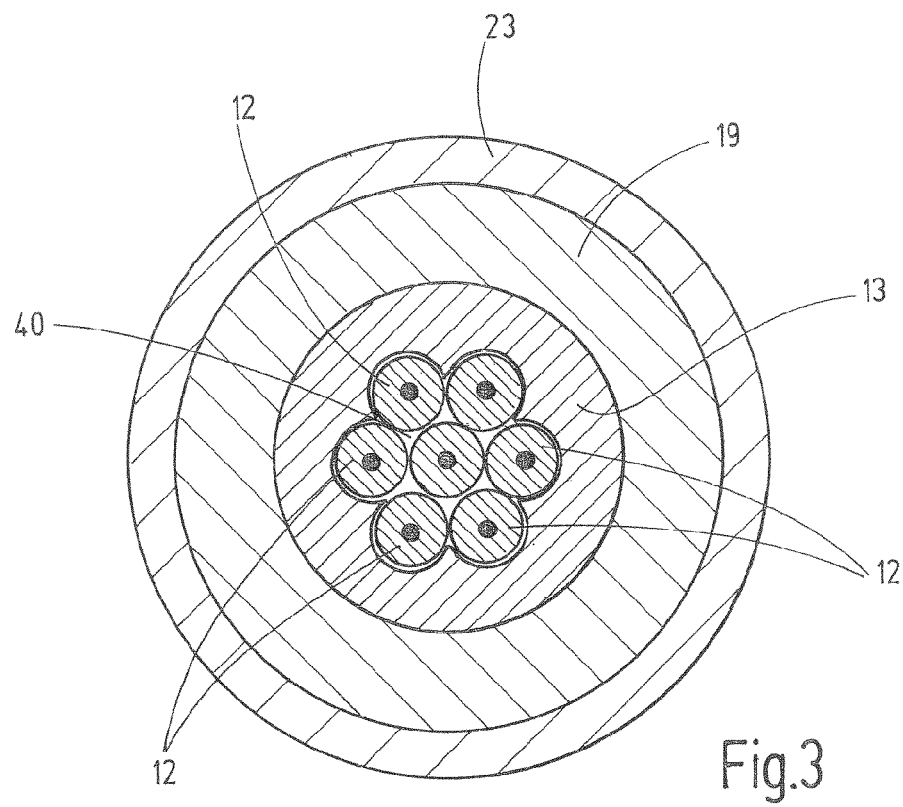
FIG. 3 is a transverse section of the cable connecting device shown in FIG. 1 taken in the plane of line III-III in FIG. 1.
Figure 5:
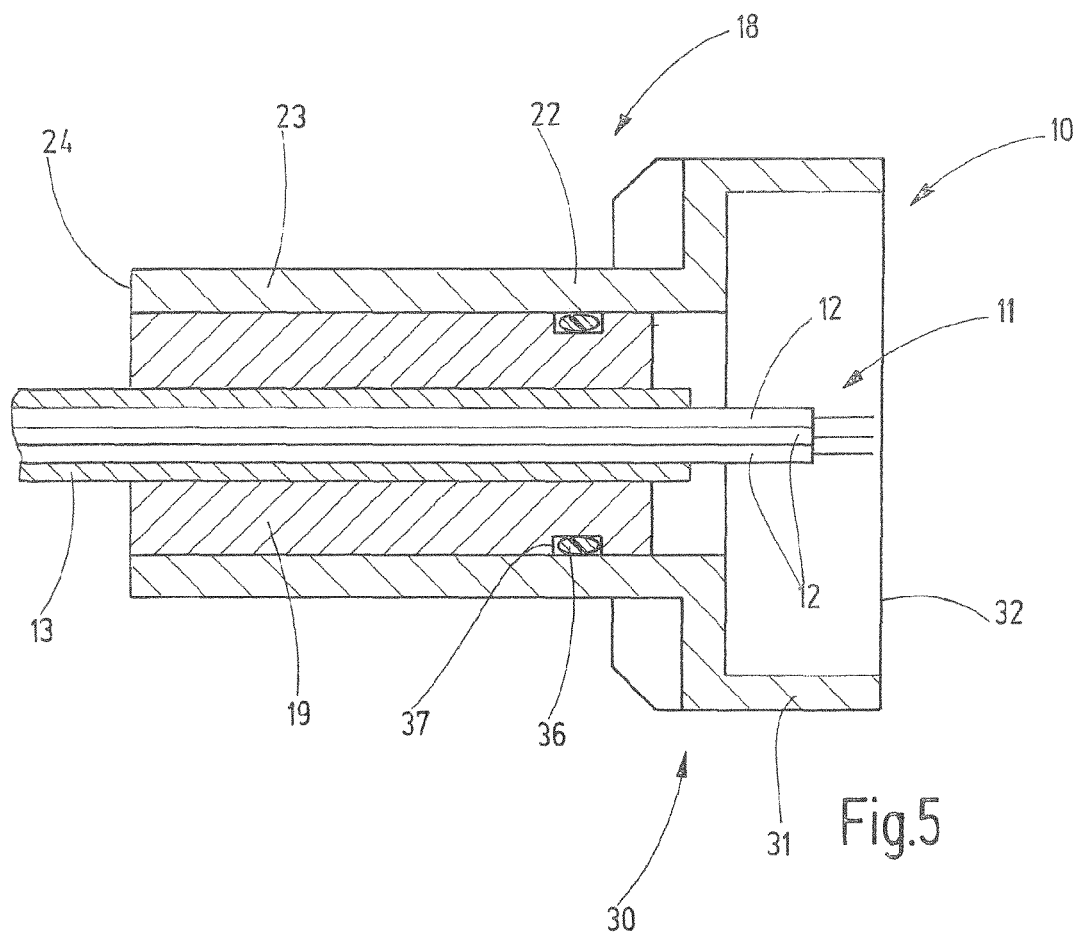
FIG. 5 is a longitudinal section of an alternative embodiment of cable connecting device in accordance with the invention with the cable in an undeformed original condition.

In this undeformed original state of the outer sleeve 18 as illustrated in FIG. 1, 3 or 5 there is established a connection with the outer sleeve 18 and the inner sleeve 19 that is free of ignition gaps. If the inner sleeve 19 and the outer sleeve 18 are arranged coaxially relative to each other, they—in accordance with the example—abut against each other in a contact section 22 of the outer sleeve 18 adjacent to the crimping section 23 and without an ignition gap. The contact section 22 of the outer sleeve 18 remains undeformed during the crimping operation as will become apparent.

The crimping section 23 forms a free end 24 of the outer sleeve 18 and the inner sleeve 19 and the outer sleeve 18 preferably are arranged in alignment with each other at the free end 24. The crimping section 23 extends—starting from the free end 24 of the outer sleeve 18—to a fastening section 25 of the outer sleeve 18. In the exemplary embodiment as shown in FIGS. 1 and 2, the fastening section 25 comprises an external screw thread 26 and a flange 27. In accordance with this embodiment, the flange 27 represents the fastening end 28 of the outer sleeve 18 opposite the free end 24. Referring to the exemplary embodiment of the cable-connecting device 10 shown by FIGS. 1 and 2, the inner sleeve 19 also terminates at the fastening end 28 or the flange 27 of the outer sleeve 24 in a joint or common plane. Consequently, the inner sleeve extends completely axially inside the outer sleeve 18.

The inner sleeve 19 is arranged at least along the crimping section 23 of the outer sleeve 18 between the cable 11 and the outer sleeve 18. Consequently, the inner sleeve 19 can also extend from the free end 24 of the outer sleeve 18 along the crimping section 23 and in the region of the fasting section 25 ahead of or short of the free end 28, as is shown, for example, with reference to the modified exemplary embodiment of FIG. 5. It is also possible for the axial length of the inner sleeve 19 to be greater than the outer sleeve 18.

The configuration of the fastening section 25 may vary. Instead of the external screw thread 26 and/or the flange 27, it is possible to provide other fastening or mounting means, for example, snap-type connecting means. Referring to the exemplary embodiment as in FIG. 5, a cap section 30 is provided instead of the fastening section 25, with the cap section adjoining the crimping section 23 of the outer sleeve 18. The cap section 30 has a cap 31 that is open in axial direction on the axial opening 32, with the cap, for example, defining a hollow cylindrical contour on the outer sleeve 18. In doing so, the axial opening 32 forms the end of the outer sleeve 18 opposite the free end 24. The cap 31 of the cap section 30 of the outer sleeve 18 can be used as part of a cover or a housing. Basically, the cap section 30 can be configured as desired.

The outer sleeve 18 consists of a first material that can be plastically deformed when force is applied with a crimping tool. In the exemplary embodiment, the outer sleeve 18 consists of metal or of a metallic alloy, preferably steel. The sleeve is made of a continuous piece of the same first material, without seams and joints.

The inner sleeve 19 also preferably is made in one piece, without seams and joints, of a uniform second material that is different from the first material and exhibits elastic deformability. The second material may be, for example, a wrought alloy, in particular an aluminum wrought alloy. The second material for the inner sleeve 19 could also be an elastomer. It is important that the second material for the inner sleeve 19 will not plastically deform—different from the first material for the outer sleeve 18 when the crimping tool is used—but will deform elastically.

The cable sheath 13 consists of an electrically insulating elastomer, for example, rubber. The plastic sheath of each core 12 may consist of the same material as the cable sheath 13.

Referring to the embodiments described here, a seal 36 is provided between the inner sleeve 19 and the outer sleeve 18, said sleeve being configured as an O-ring, for example. In accordance with the example, the seal 36 is arranged in the contact section 22 on the outer sleeve 18. For axial positioning, the seal 36 is seated in an annular groove 37 that is provided on the outside surface of the inner sleeve 19 facing the outer sleeve 18. The depth of the annular groove 37 measured radially with respect to the longitudinal axis of the hollow cylindrical inner sleeve 19 is less than the dimension of the cross-section of the seal 36 measured in the same direction, so that said seal—after being set into the annular groove 37—protrudes from said annular groove in radial direction. When the outer sleeve 18 is arranged coaxially relative to the inner sleeve 19, the seal 36 is deformed and thus abuts in a sealing manner between the outer sleeve 18 and the inner sleeve 19. FIGS. 1, 2 and 5 show the deformed state of the seal 36 in operative position. It is understood that, deviating from the exemplary embodiment, the undeformed cross-sectional form of the seal 36 need not be round or circular, but may basically have any desired contour.

The mechanical connection between the cable-connecting device 10 and the cable 11 for creating the explosion-proof assembly 14 is established as follows:

The cable 11, the inner sleeve 19 and the outer sleeve 18 are arranged coaxially relative to each other at the desired connecting point. In doing so, the order is not of consequence. For example, the inner sleeve 19 can first be slipped onto the cable sheath 13, and subsequently the outer sleeve 18 may be arranged coaxially with respect to the inner sleeve 19. The seal 36 is arranged in the annular groove 37, before the outer sleeve 18 is coaxially arranged relative to the inner sleeve 19. The seal 36 abuts in a sealing manner against the inner sleeve 19, as well as against the outer sleeve 18.

Subsequently, with the use of a crimping tool, the crimping section 23 is pressed radially inward toward the cable 11 and plastically deformed. In doing so, the inner sleeve 19, as well as the cable sheath 13, deform along the crimping section 23, as is schematically illustrated by FIG. 2. As a result, the cable sheath 13 abuts—without an ignition gap—in the region of the crimping section 23 against the inner sleeve 19, as well as against the cores 12 of the cable 11. Potentially existing gaps are reduced in view of their cross-section, or they are completely closed, as a result of which ignition gaps are eliminated so that an explosion-proof connection is established between the cable 11 and the cable-connecting device 10.

Figure 4:
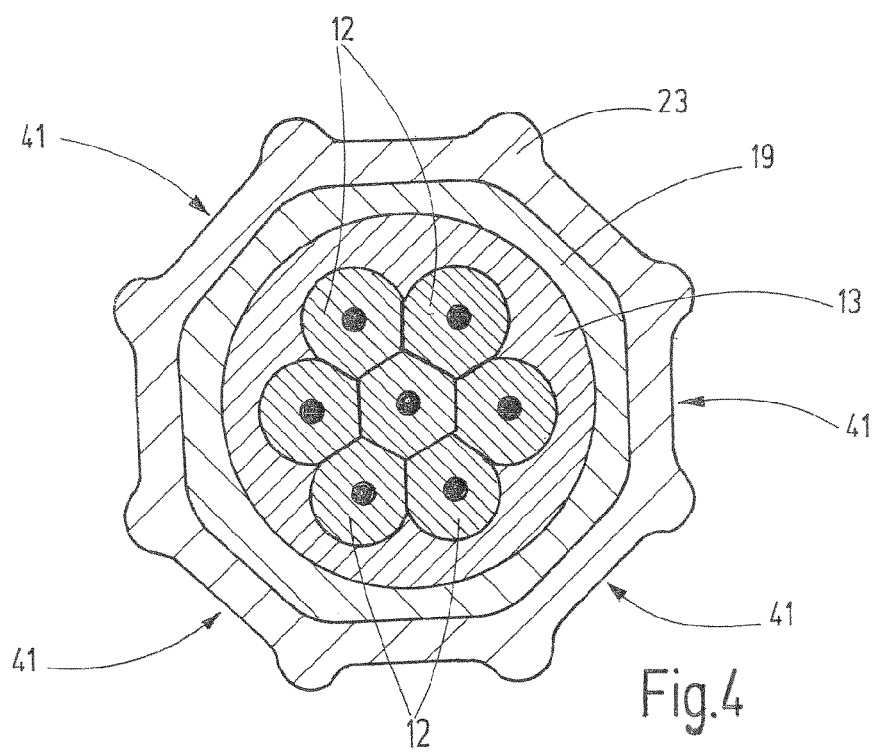
FIG. 4 is a transverse section of the cable connecting device shown in FIG. 2 taken in the plane of line IV-IV in FIG. 2.

Referring to FIGS. 3 and 4, the effect of the invention can further be understood. FIG. 3 shows a cross-section through the assembly 14 in the original state with an undeformed outer sleeve 18. There, it can be seen that gaps 40 exist inside the cable sheath 13 between the cores 12 and/or between the cable sheath 13 and the cores 12. These gaps 40 may form an ignition gap and must thus be eliminated in order to achieve the explosion protection. Due to the elastomeric materials of the cable sheath 13 as well as the inner sleeve 19, the cable sheath 13 presses against the cores 12, pressing said cores 12 against each other. In doing so, gaps are eliminated between the cable sheath 13 and, optionally, also between the cores 12. If a plurality of cores 12 are arranged together in one cable sheath 13, as is illustrated by the example, the insulation of the individual cores 12 is also elastically deformable, so that any gaps between directly adjacent cores 12 also are eliminated by elastic deformation.

Inasmuch as the inner sleeve 19 also is elastically deformable, initially it may not abut tightly against the crimping section 23 of the outer sleeve 18 and against the cable sheath 13. The elastomeric properties of the inner sleeve 19 are important because the plastic deformation of the crimping section 23, as schematically shown by FIG. 4, may occur at crimping locations 41 that are spaced apart in circumferential direction and thus may be irregular, viewed in circumferential direction. Due to the elasticity of the inner sleeve 19, however, a complete and spark-gap-free abutment in circumferential direction in the crimping section 23 between the inner sleeve 19 and the outer sleeve 18 can still be achieved. In order to avoid any gaps still remaining after the deformation of the crimping section 23 as best as possible, the seal 36 is arranged in a sealing manner between the inner sleeve 19 and the outer sleeve 18.

The length L of the crimping section 23 is selected such that, during the plastic deformation of the crimping section 23 by the crimping tool, the elastic deformation of the inner sleeve 19, as well as of the cable sheath 13, occurs along a sufficient length and does not only result in a displacement of material in axial direction. For this purpose, the length L is at least as great as the inside diameter D of the crimping section 23 in undeformed original condition. Independent of the inside diameter D of the crimping section 23, the length L is preferably greater than six millimeters and, further preferably, greater than ten or twenty millimeters.

Figure 6:
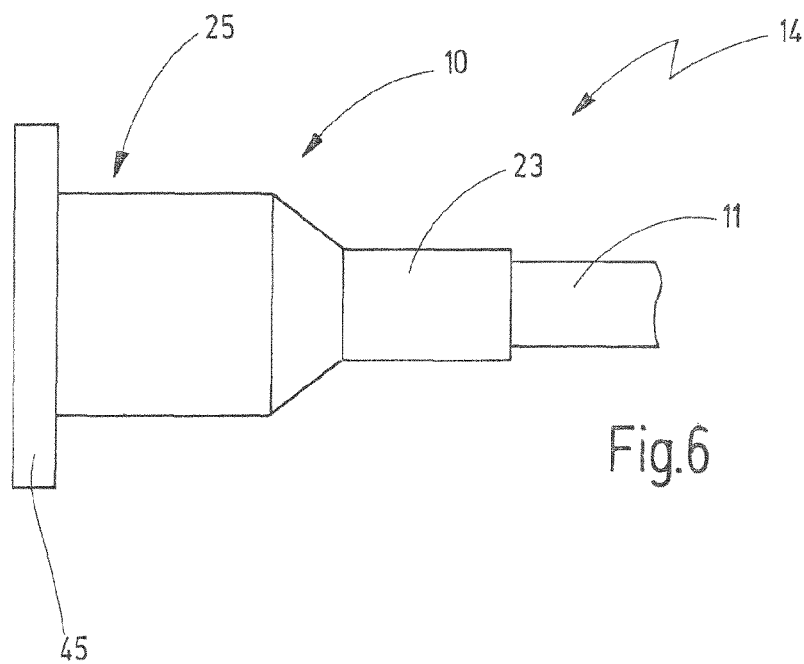
FIG. 6 is a side view of a cable connecting device in accordance with the invention for use in connection to a housing wall.
Figure 7:
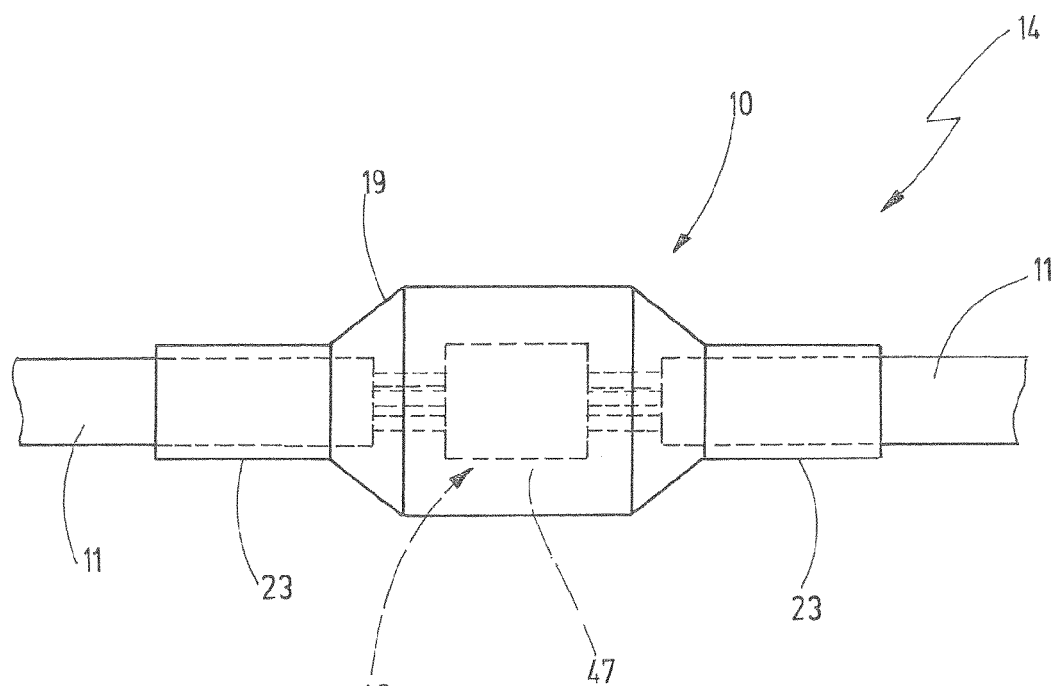
FIG. 7 is a schematic representation of an alternative embodiment of cable connecting device in accordance with the invention for the explosion proof encapsulation of an electrical connecting point between two cables.
Figure 8:
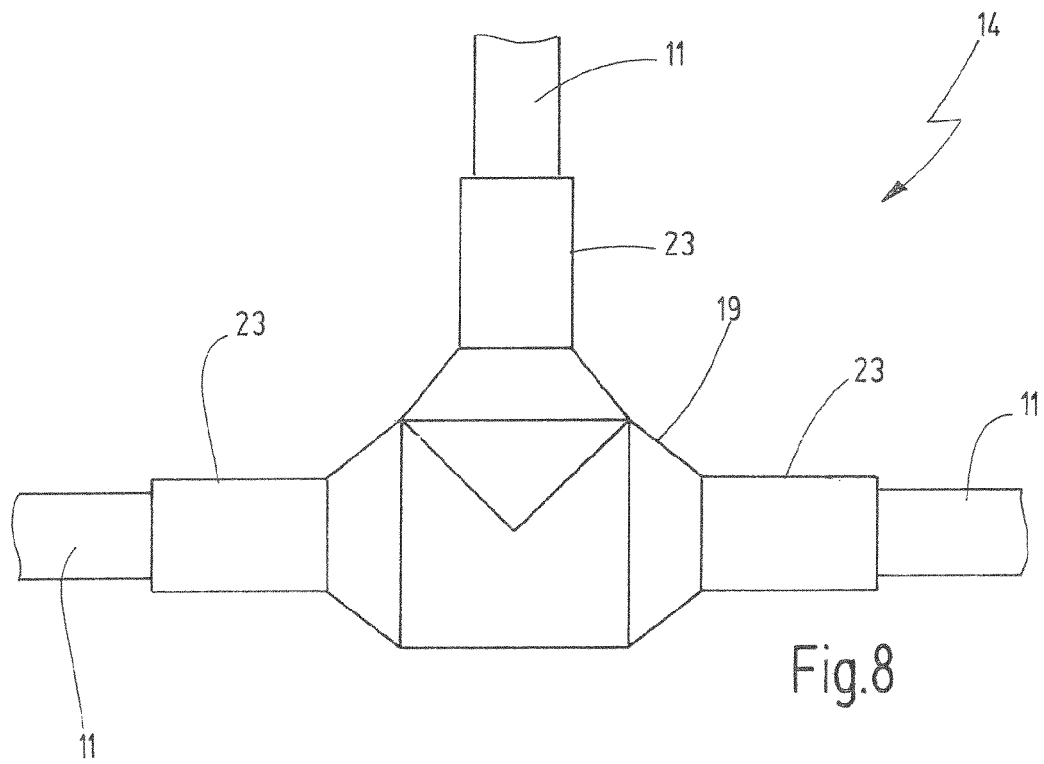
FIG. 8 is a schematic representation of another exemplary embodiment of a cable connecting device in accordance with the invention for the explosion proof encapsulation of an electrical contacting point with three cables.

FIGS. 6 through 8 show application examples of the cable-connecting device 10 or the assembly 14. Referring to the exemplary embodiment as in FIG. 6, the fastening section 25 of the outer sleeve 18 of the cable-connecting device 10 is fastened to a housing wall 45 in order to thread a cable 11 in an explosion-proof manner through the housing wall 45.

Referring to the exemplary embodiments as in FIGS. 7 and 8, two or more cables are electrically connected to each other at a connecting point 46 via an electrical connecting means 47. The connecting point 46 having the electrical connecting means 47 is encapsulated by the cable-connecting device 10. Depending on the number of cables 11 to be connected, the cable-connecting device 10 in the embodiments according to FIGS. 7 and 8 comprises several crimping sections 23. The section of the outer sleeve 19 adjoining the crimping section 23 forms a closed interior space in which the electrical connecting means 47 is arranged in an explosion-proof manner. In the cable-connecting device 10 shown by FIGS. 7 and 8, it is also possible to detachably or permanently connect several outer sleeves 19 to one crimping section 23 for the formation of the encapsulated interior space.

From the foregoing, it can be seen that an assembly 14 of a cable-connecting device 10 and a multi-core cable 11 is provided which form a mechanical, explosion-proof connection with each other. For this purpose, the cable-connecting device 10 has a plastically deformable outer sleeve 18 having a crimping section 23. A hollow cylindrical inner sleeve 19 made of elastically deformable material is arranged between a cable sheath 13 made of elastomer and the crimping section 23. An elastic deformation of the inner sleeve 19 and of the cable sheath 13 is caused by radially plastically deforming the crimping section 23. Any gaps 40 potentially present within the cable sheath 13 are closed due to the radial forces in the crimping section 23 such that a spark-gap-free contact between the cable sheath 13 and the cores 12 of the cable 11 and between the cable sheath 13 and the inner sleeve 19 is ensured.

LIST OF REFERENCE SIGNS

10 Cable-connecting device
11 Cable
12 Cable core
13 Cable sheath
14 Assembly
18 Outer sleeve
19 Inner sleeve
20 Cable conduit
22 Contact section
23 Crimping section
24 Free end
25 Fastening section
26 External screw thread
27 Flange
28 Fastening end
29
30 Cap section
31 Cap
32 Axial opening
36 Seal
37 Annular groove
40 Gap
41 Crimping location
45 Housing wall
46 Connecting point
47 Electrical connecting means

The invention claimed is:

1. An explosion-proof assembly (14) comprising:
    a cable-connecting device (10) and a cable (11) connected thereto, said cable (11) including a plurality of electrically conductive cores (12) enclosed by a cable sheath (13) made of an elastically deformable insulating elastomer,
    an outer sleeve (18) that includes a crimping section (23) made of a plastically deformable metallic material,
    an inner sleeve (19) coaxially and completely enclosed by said outer sleeve (18), said inner sleeve (19) being made of an elastically deformable elastomer, said inner sleeve (19) having a cylindrical cable receiving conduit (20) with an inside diameter corresponding essentially to the outside diameter of said cable sheath (13), said cable sheath (13) and cores (12) of said cable (11) extending through said inner sleeve (19), and
    said cable-connecting device (10) and cable (11) having a mechanical connection established by a plastic deformation of the crimping section (23) of the outer sleeve (18) and resulting elastic deformation of the inner sleeve (19) and the cable sheath (13) which causes the cable sheath (13) to abut in an explosion-proof spark-gap-free manner against cores (12) and against the inner sleeve (19).

2. The explosion-proof assembly of claim 1 in which said crimping section (23) of the outer sleeve (18) when in an undeformed condition has an inside diameter (D) that essentially corresponds to an outside diameter of the inner sleeve (19).

3. The explosion-proof assembly of claim 1 including a seal (36) arranged between the inner sleeve (19) and the outer sleeve (18).

4. The explosion-proof assembly of claim 3 in which said seal (36) is arranged in an annular groove (37) in one of the inner sleeve (19) or the outer sleeve (18).

5. The explosion-proof assembly of claim 4 in which said annular groove (37) has a depth less than a radial dimension of a cross-sectional contour of the seal (36) when undeformed.

6. The explosion-proof assembly of claim 1 in which the crimping section (23) has a length (L) greater than an inside diameter (D) of the crimping section (23).

7. The explosion-proof assembly of claim 6 in which the length (L) of the crimping section (23) is at least 6 millimeters.

8. The explosion-proof assembly of claim 1 in which said outer sleeve (18) is made of steel.

9. The explosion proof assembly of claim 1 in which said outer sleeve 18 has a fastening section (28) larger in diameter and integral with the crimping section (23).

* * * * *